US011933801B2

United States Patent
Aoyama et al.

(10) Patent No.: US 11,933,801 B2
(45) Date of Patent: Mar. 19, 2024

(54) TRANSPORT DEVICE AND SPECIMEN ANALYSIS SYSTEM INCLUDING TRANSPORT DEVICE

(71) Applicant: Hitachi High-Tech Corporation, Tokyo (JP)

(72) Inventors: Yasuaki Aoyama, Tokyo (JP); Ryosuke Hoshi, Tokyo (JP); Satoru Kaneko, Tokyo (JP); Hiroyuki Kobayashi, Tokyo (JP); Takeshi Tamakoshi, Tokyo (JP); Hiroshi Watanabe, Tokyo (JP); Katsuhiro Kambara, Tokyo (JP); Kuniaki Onizawa, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 63 days.

(21) Appl. No.: 17/798,682

(22) PCT Filed: Nov. 10, 2020

(86) PCT No.: PCT/JP2020/041846
§ 371 (c)(1),
(2) Date: Aug. 10, 2022

(87) PCT Pub. No.: WO2021/166338
PCT Pub. Date: Aug. 26, 2021

(65) Prior Publication Data
US 2023/0138212 A1 May 4, 2023

(30) Foreign Application Priority Data
Feb. 18, 2020 (JP) .................. 2020-025056

(51) Int. Cl.
*G01N 35/04* (2006.01)
*B65G 54/02* (2006.01)

(52) U.S. Cl.
CPC ............. *G01N 35/04* (2013.01); *B65G 54/02* (2013.01); *G01N 2035/0477* (2013.01)

(58) Field of Classification Search
CPC ........... G01N 35/04; G01N 2035/0477; G01N 2035/0489; B65G 54/02; H02K 1/145;
(Continued)

(56) References Cited

U.S. PATENT DOCUMENTS 6,045,319 A * 4/2000 Uchida ................ H02K 41/031
414/676
9,312,734 B2 * 4/2016 Kamiki .................. H02K 3/345
(Continued)

FOREIGN PATENT DOCUMENTS

EP 1 659 672 A1 5/2006
EP 3 006 943 A1 4/2016
(Continued)

OTHER PUBLICATIONS

International Search Report (PCT/ISA/210) issued in PCT Application No. PCT/JP2020/041846 dated Jan. 19, 2021 with English translation (five (5) pages).
(Continued)

*Primary Examiner* — Mark A Deuble
(74) *Attorney, Agent, or Firm* — Crowell & Moring LLP

(57) ABSTRACT

The present invention provides a transport device and a specimen analysis system including the transport device that reduce the pulsation of thrust for moving an object to be transported, reduce vibration of the object to be transported during transport, and realize stable transport. The transport device of the present invention includes a first electromagnet unit including a first tooth made of a magnetic body, a first core connected to the first tooth and made of a magnetic body, and a first winding formed around the first core; a second electromagnet unit including a second tooth installed
(Continued)

adjacent to the first electromagnet unit and made of a magnetic body, a second core connected to the second tooth and made of a magnetic body, a second winding formed around the second core; and a magnetic coupling unit made of a magnetic body between the first tooth of the first electromagnet unit and the second tooth of the second electromagnet unit.

15 Claims, 20 Drawing Sheets

(58) Field of Classification Search
CPC ... H02K 29/03; H02K 2201/18; H02K 41/031
See application file for complete search history.

(56) References Cited

U.S. PATENT DOCUMENTS

| | | | | |
|---|---|---|---|---|
| 9,511,681 | B2* | 12/2016 | Wernersbach | G05B 19/4189 |
| 9,939,455 | B2* | 4/2018 | Schneider | B65G 54/02 |
| 10,239,708 | B2* | 3/2019 | Sinz | G01N 35/04 |
| 2004/0145267 | A1 | 7/2004 | Lowry et al. | |
| 2009/0160287 | A1 | 6/2009 | Nakagawa | |
| 2014/0234065 | A1 | 8/2014 | Heise et al. | |
| 2015/0276781 | A1* | 10/2015 | Riether | G01N 27/24 |
| | | | | 700/230 |
| 2016/0054341 | A1* | 2/2016 | Edelmann | G01N 35/04 |
| | | | | 198/619 |
| 2016/0341751 | A1* | 11/2016 | Huber | G01N 35/00584 |
| 2020/0091805 | A1* | 3/2020 | Kegeler | H02K 21/24 |

FOREIGN PATENT DOCUMENTS

| | | |
|---|---|---|
| JP | 62-100161 A | 5/1987 |
| JP | 2011-199936 A | 10/2011 |
| JP | 2017-77971 A | 4/2017 |

OTHER PUBLICATIONS

Japanese-language Written Opinion (PCT/ISA/237) issued in PCT Application No. PCT/JP2020/041846 dated Jan. 19, 2021 (three (3) pages).

Extended European Search Report issued in European Application No. 20919889.4 dated Jun. 12, 2023 (11 pages).

* cited by examiner

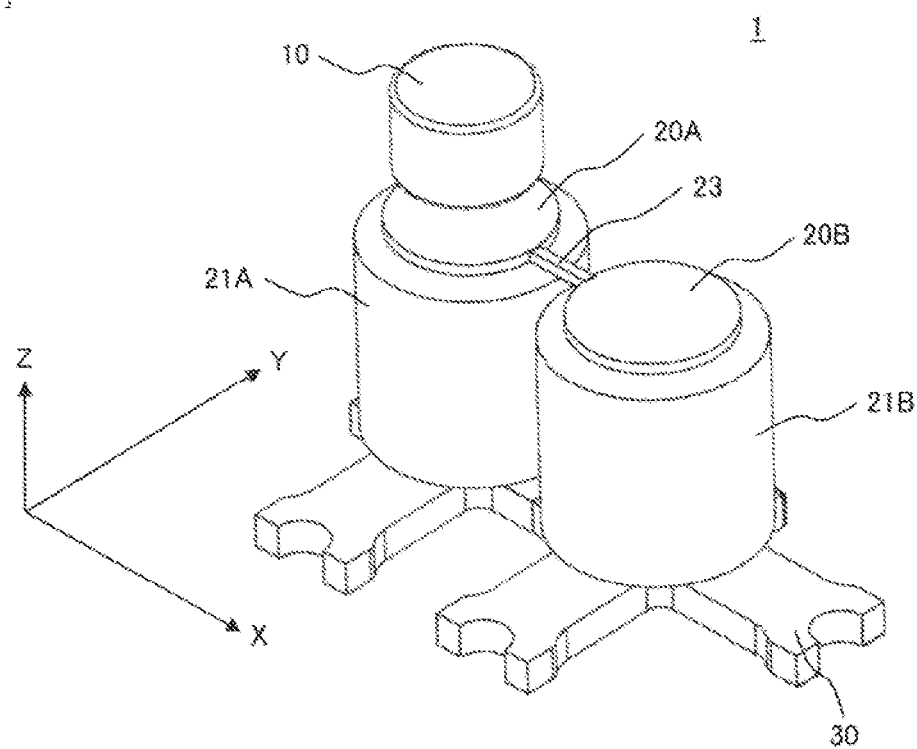
[FIG. 1]

[FIG. 2]
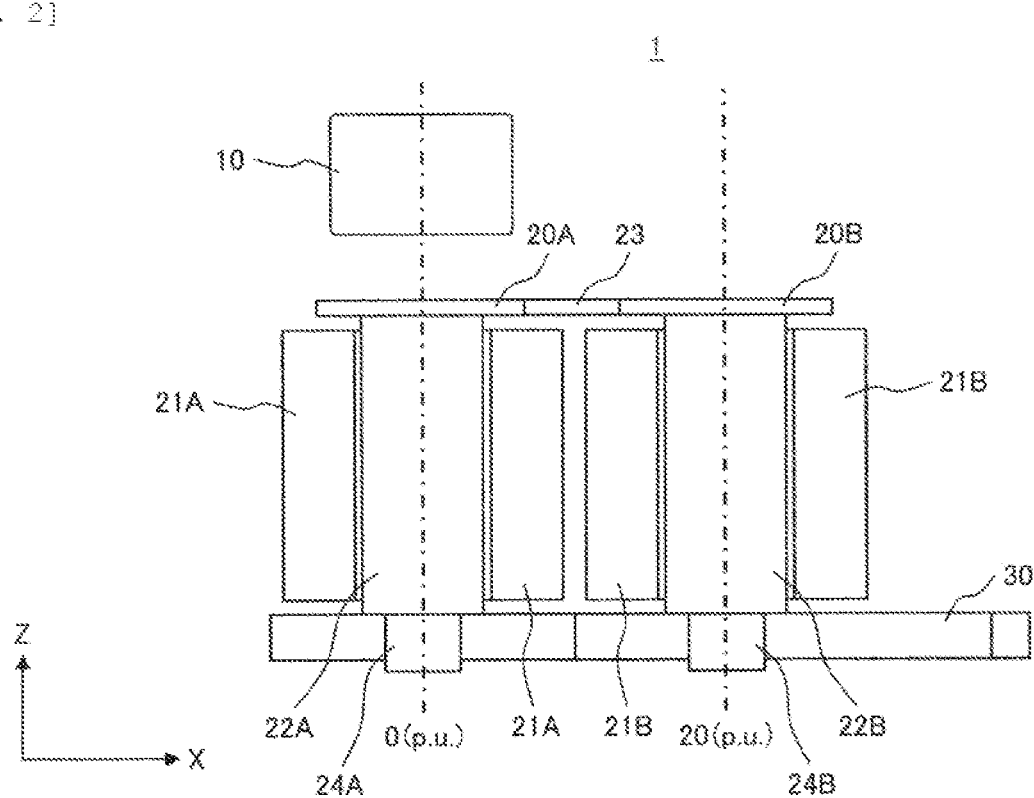

[FIG. 3]
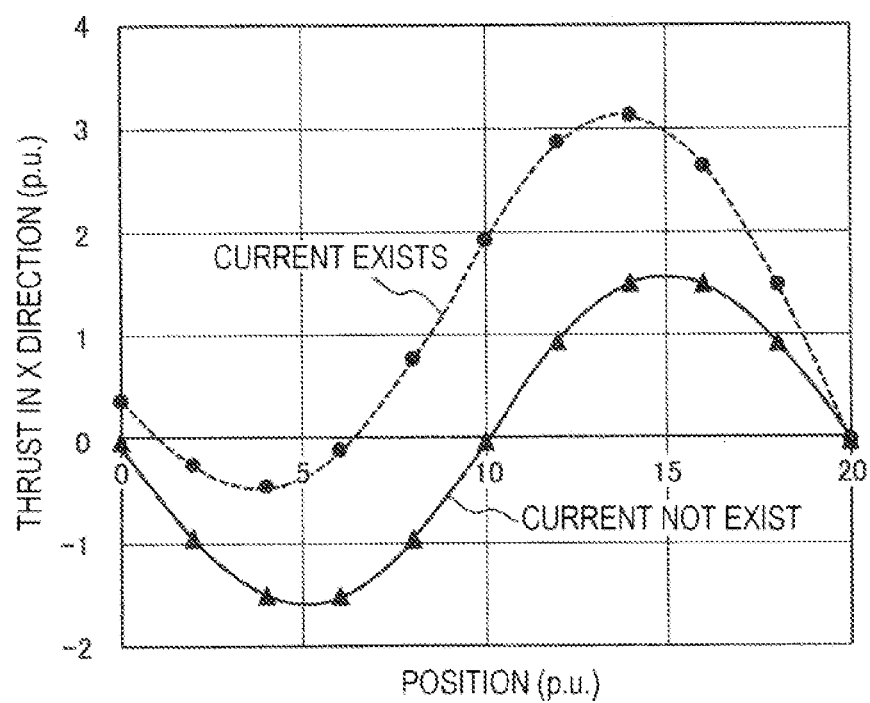

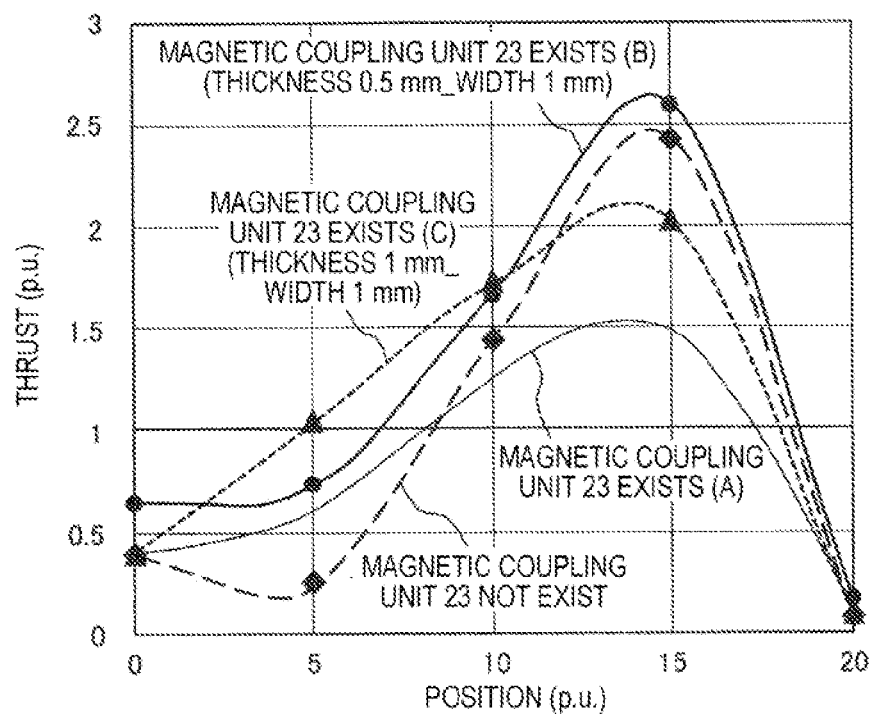
[FIG. 4]

[FIG. 5]
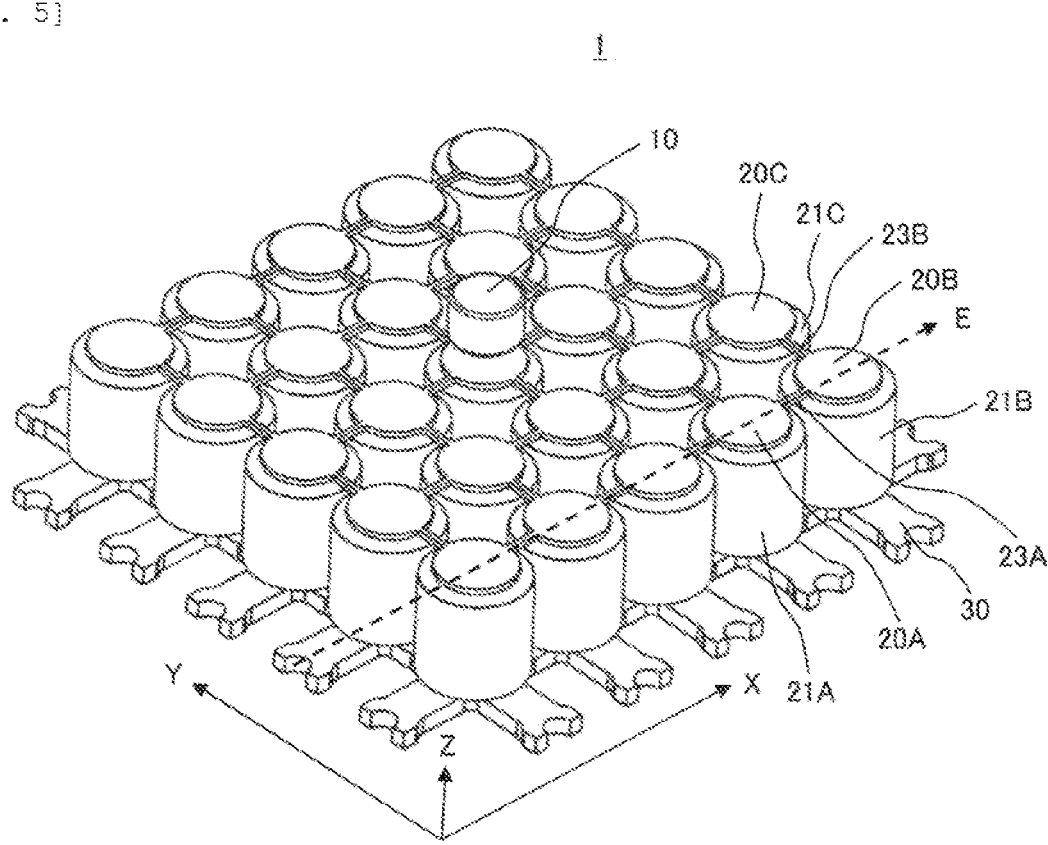

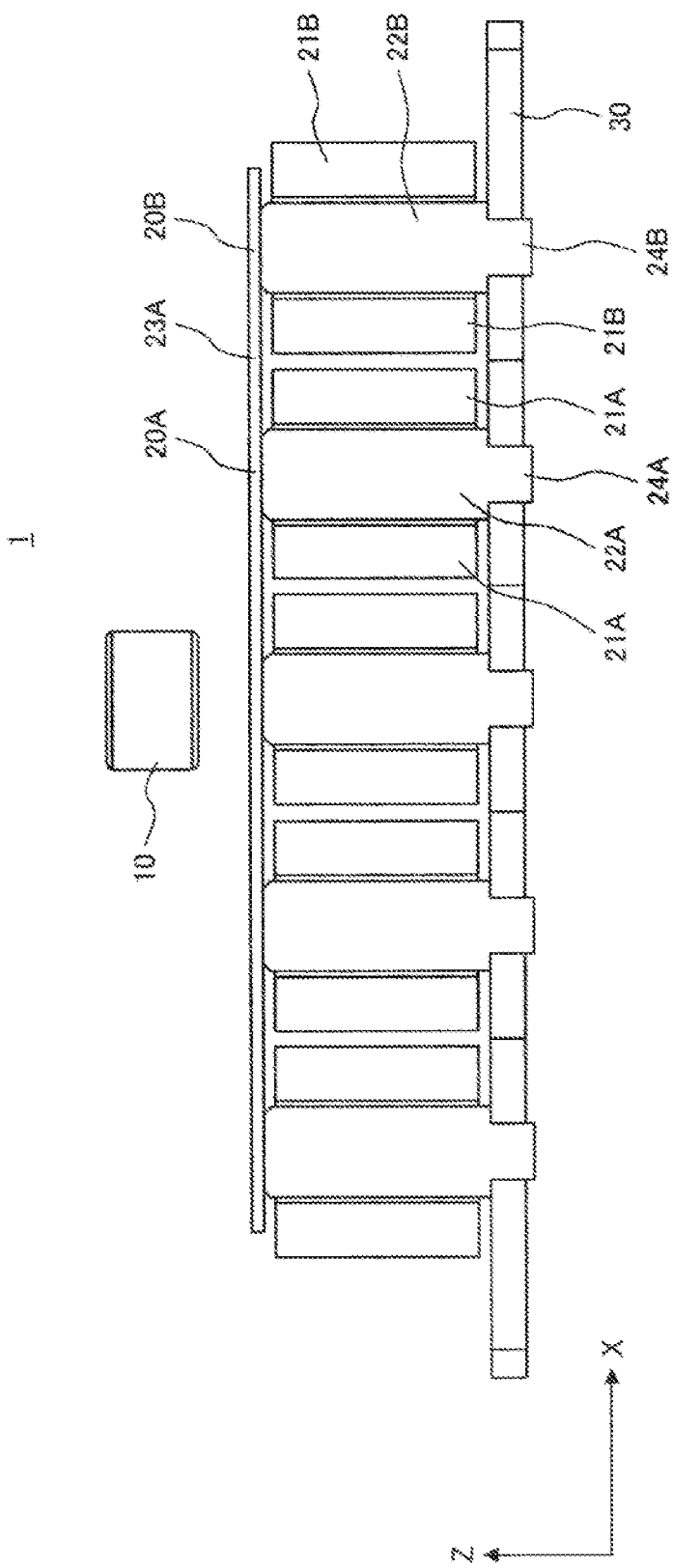

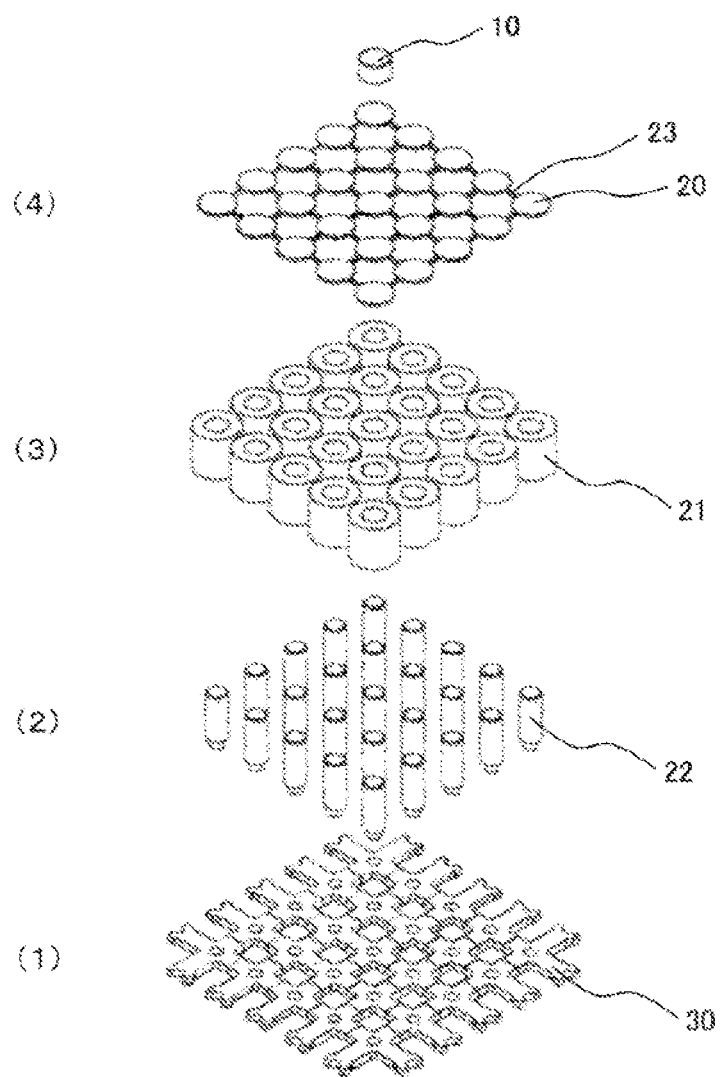
[FIG. 7]

[FIG. 8]
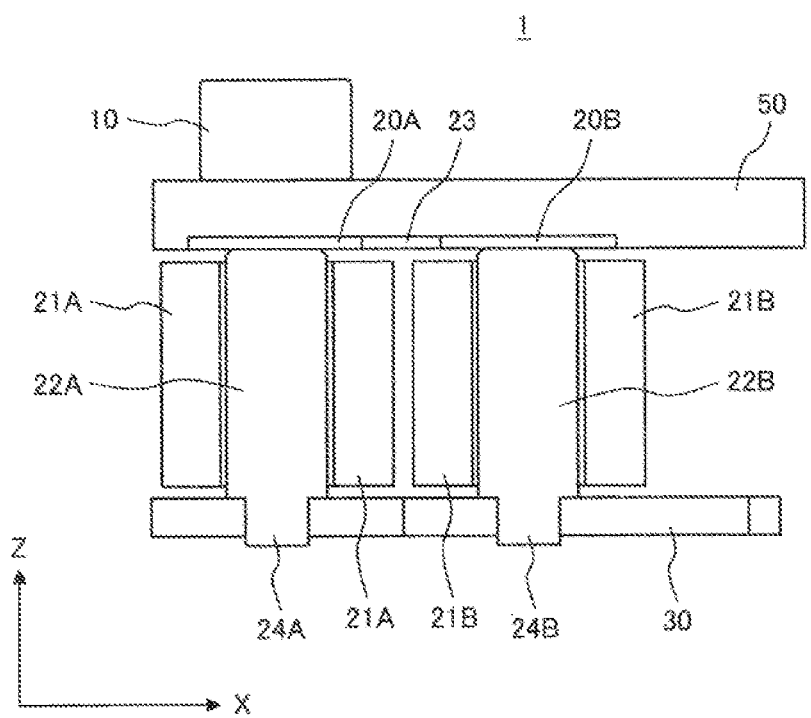

[FIG. 9]
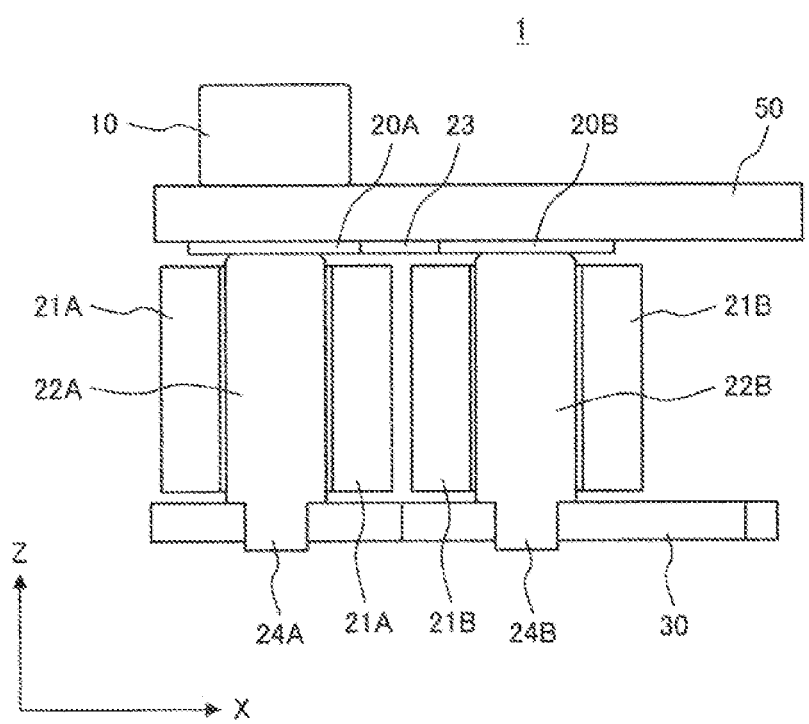

[FIG. 10A]
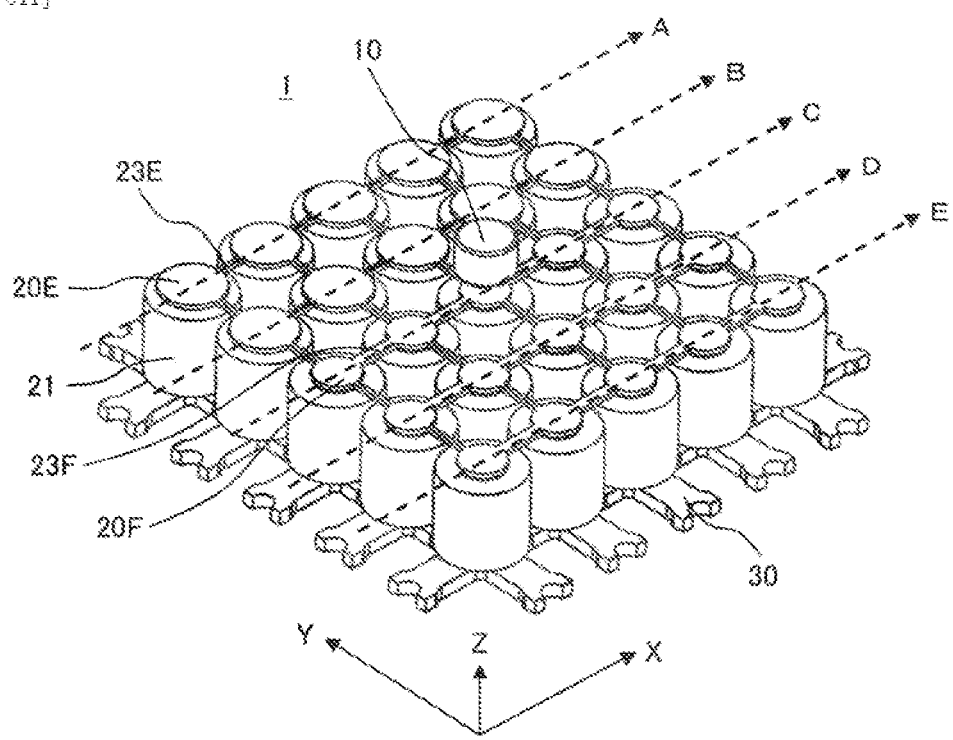

[FIG. 10B]
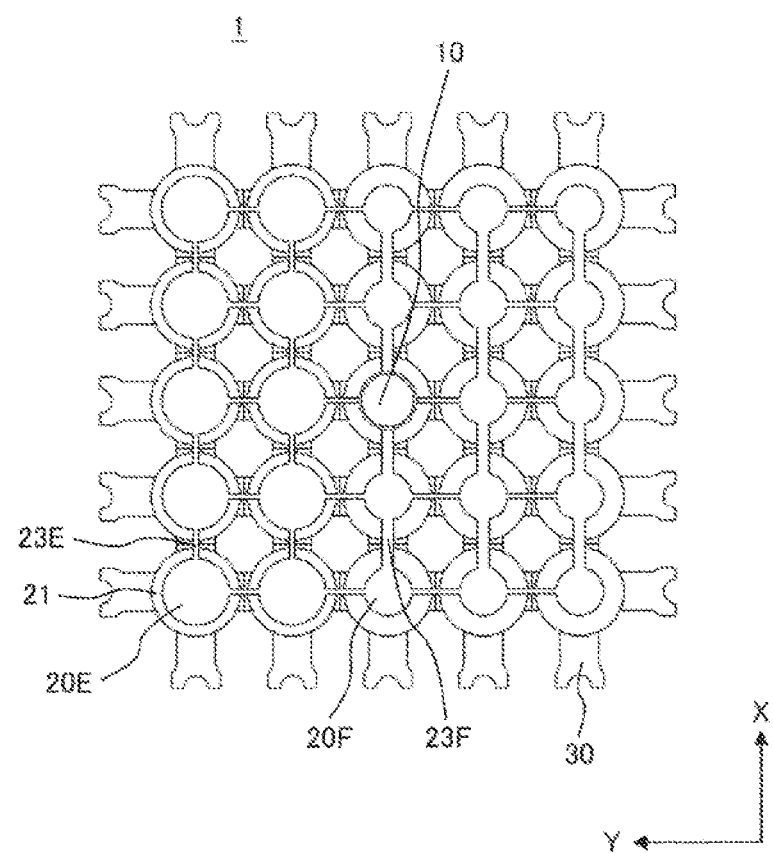

[FIG. 12]
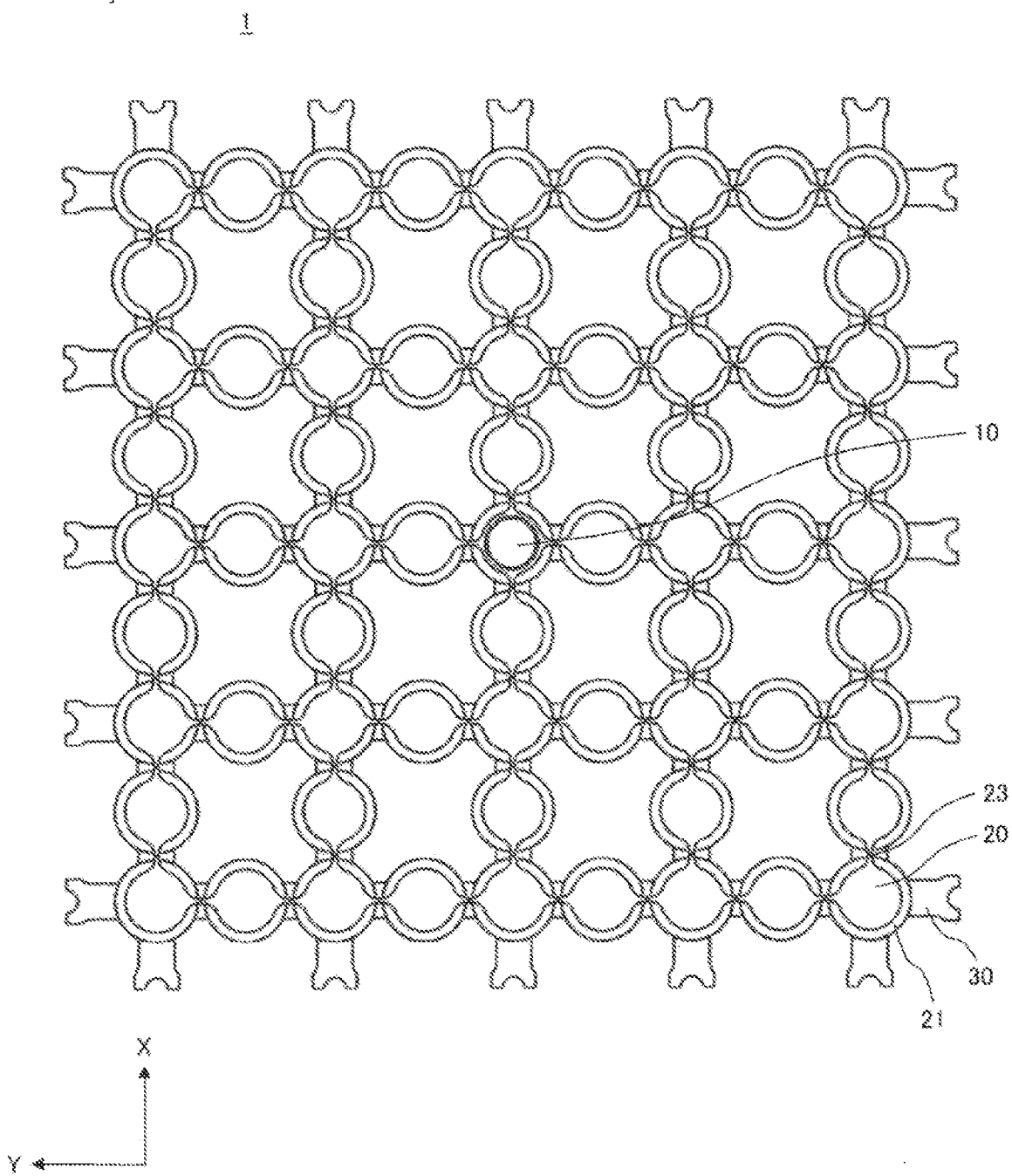

[FIG. 13]
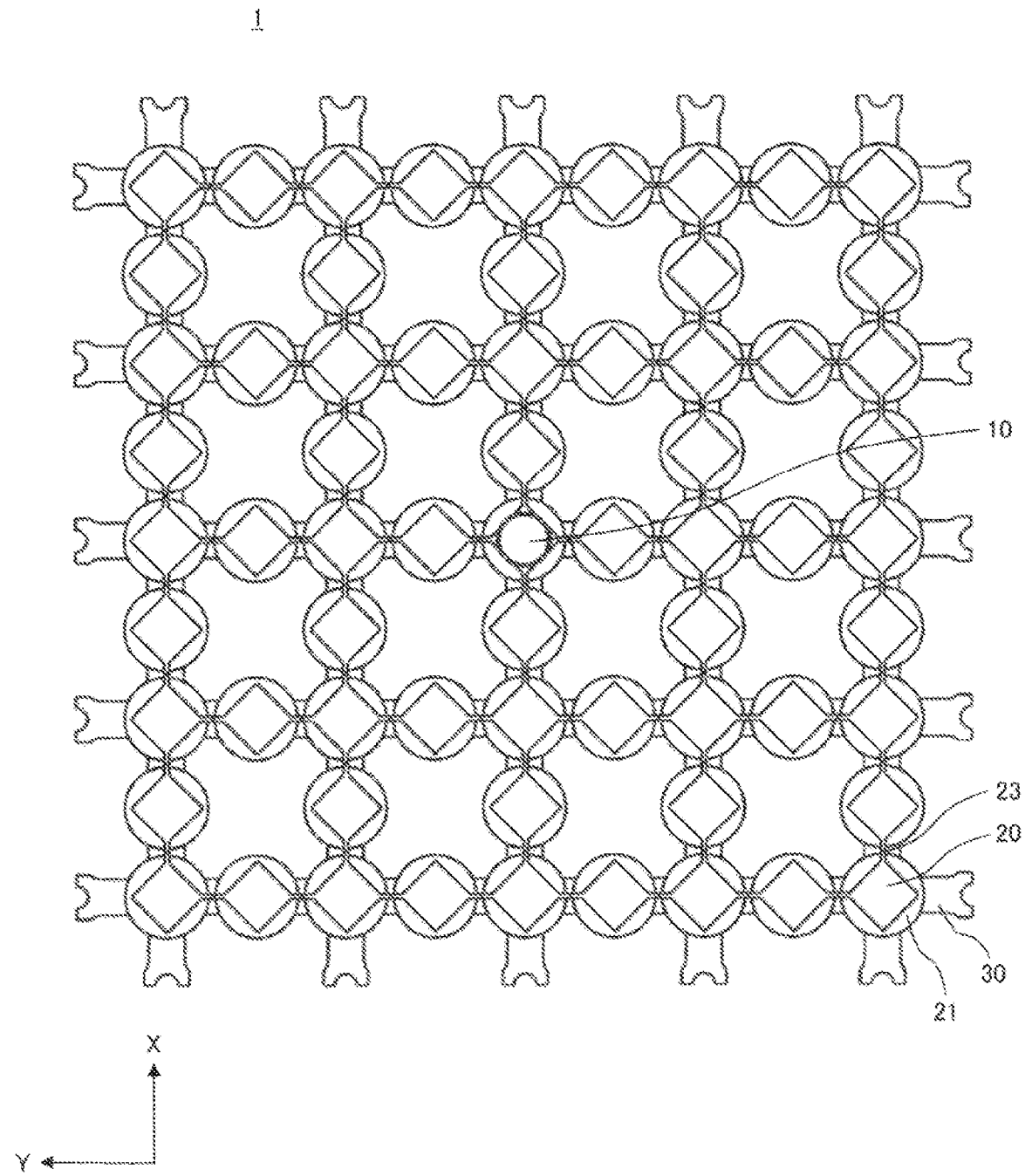

[FIG. 14]
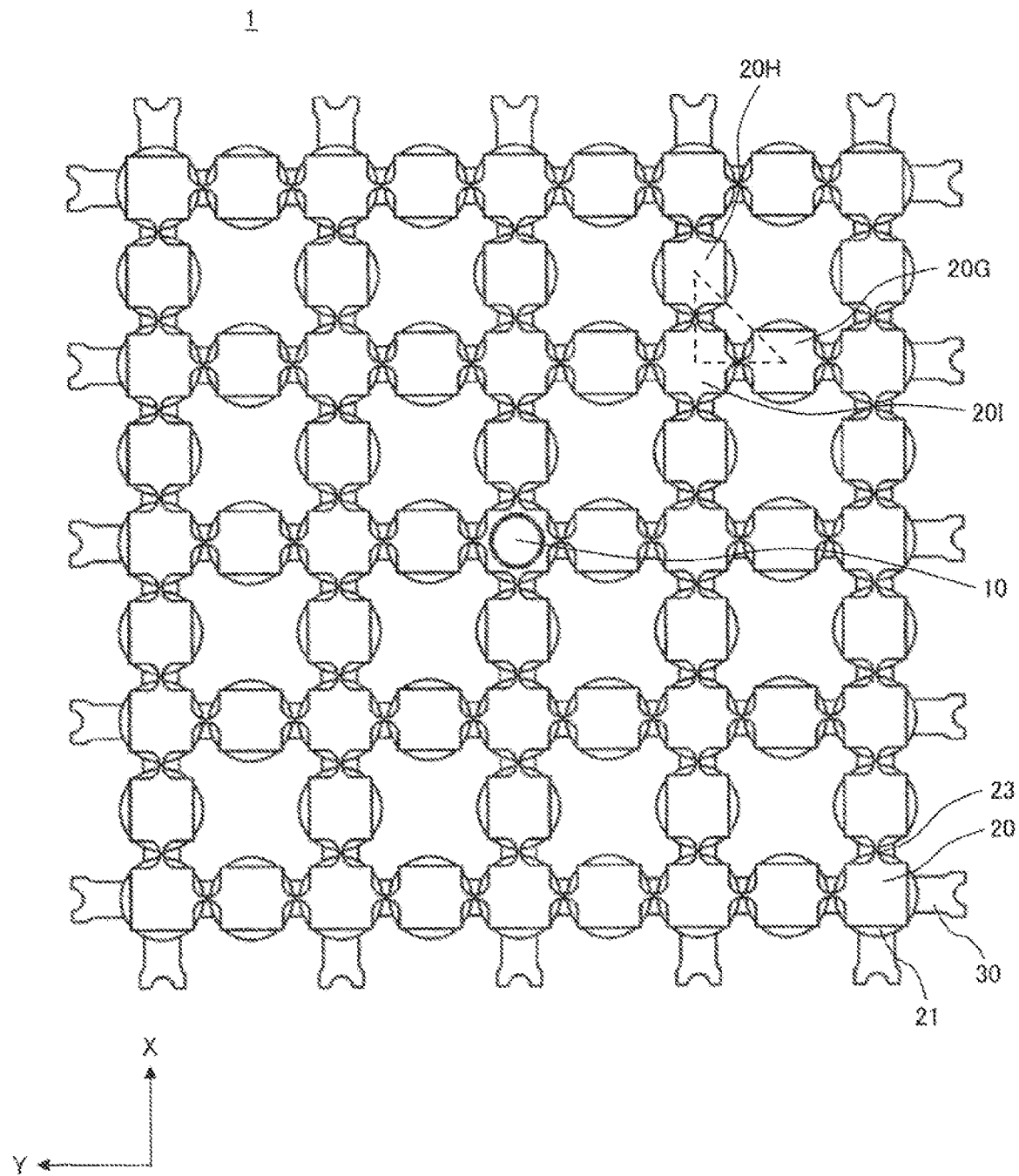

[FIG. 15]
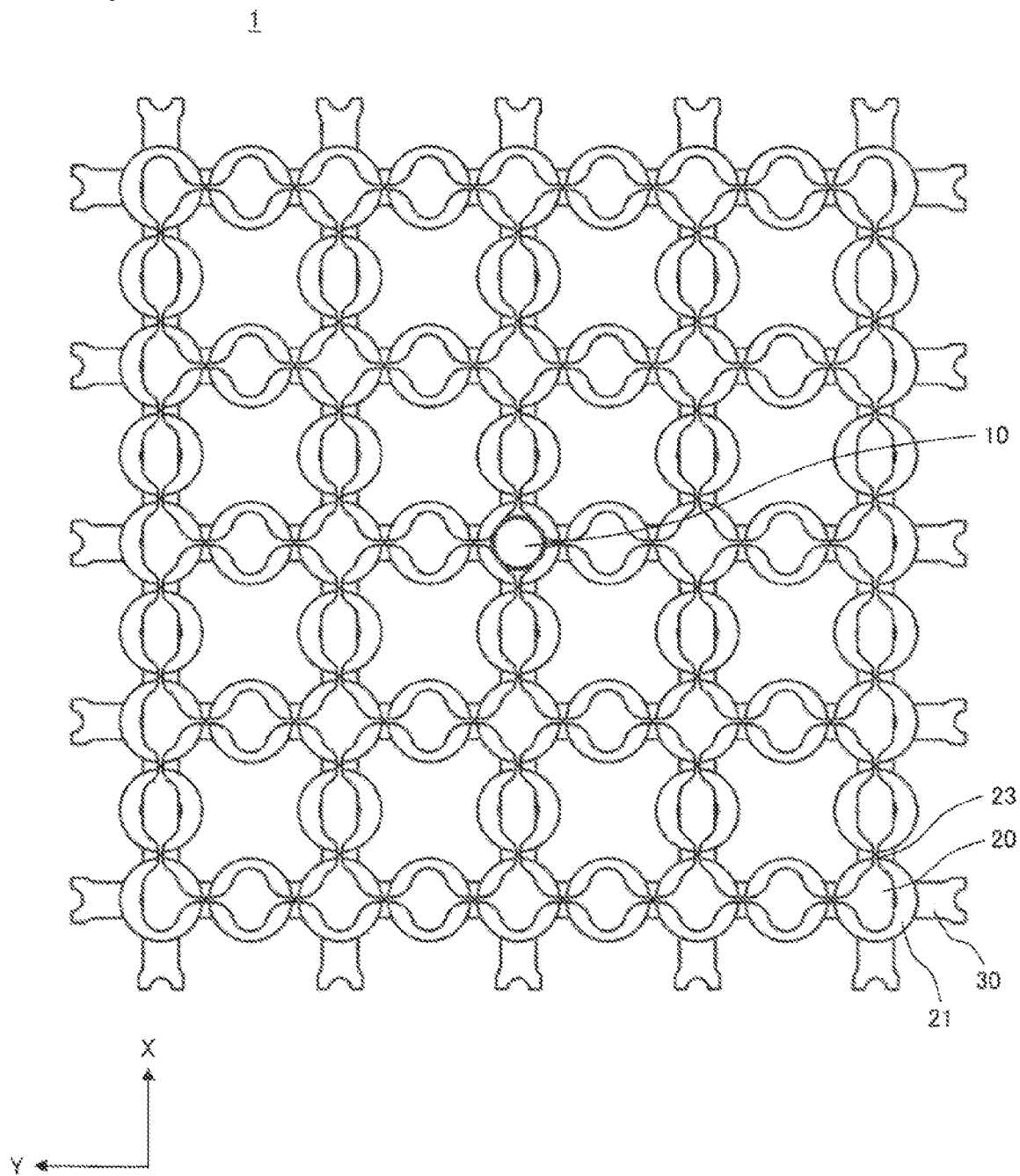

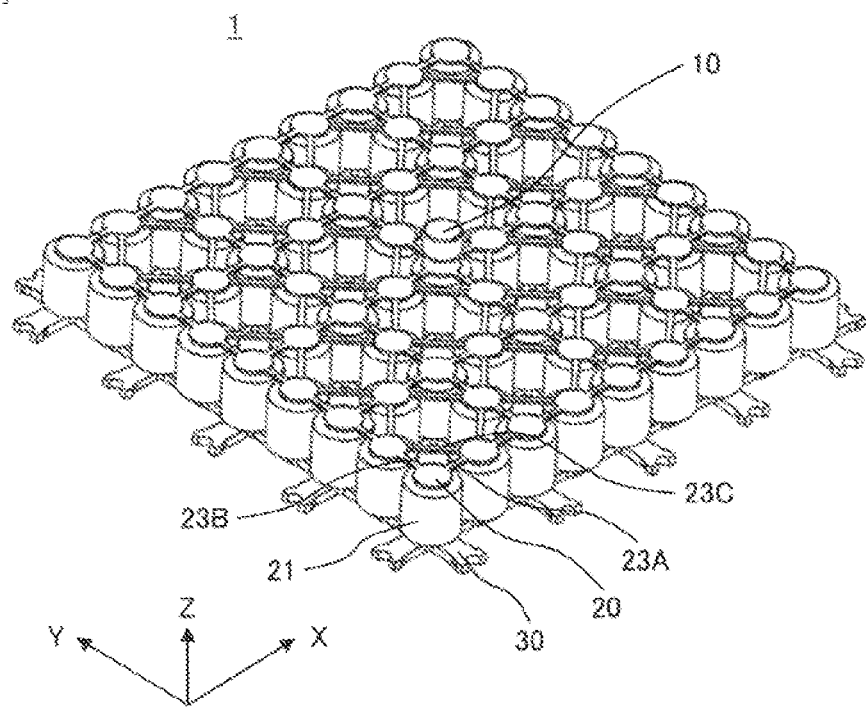
[FIG. 16A]

[FIG. 16B]
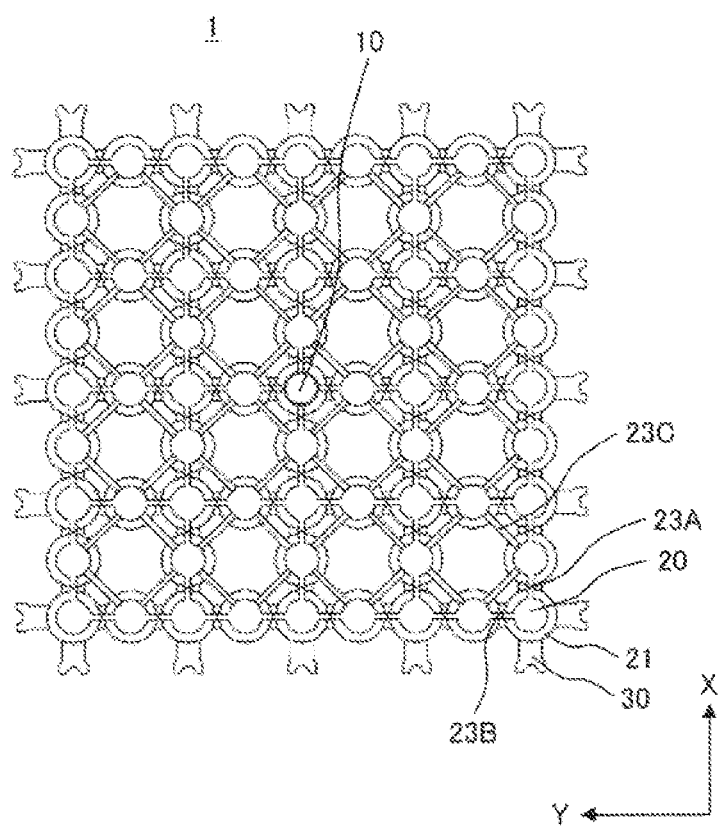

[FIG. 18]
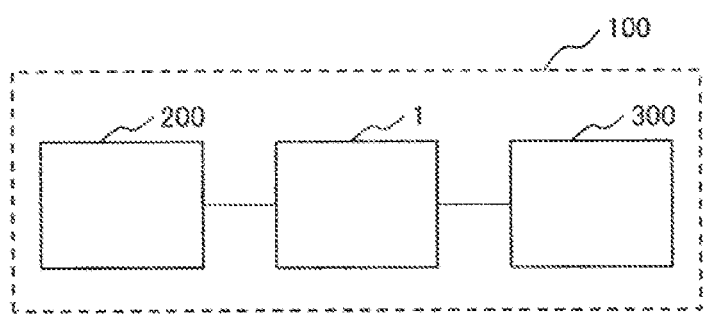

TRANSPORT DEVICE AND SPECIMEN ANALYSIS SYSTEM INCLUDING TRANSPORT DEVICE

TECHNICAL FIELD

The present invention relates to a transport device and a specimen analysis system including the transport device.

BACKGROUND ART

A specimen analysis system for clinical examination is a system that examines instructed analysis items for samples (hereinafter referred to as "specimen") such as blood, plasma, serum, urine, and other body fluids.

The specimen analysis system connects a plurality of devices having a predetermined function, and each device examines each analysis item. Then, in order to streamline the work of an examination room, the specimen analysis system is used as one system by connecting a specimen analysis device that executes a plurality of analyses of biochemistry, immunity, blood, bacteria, and the like and a specimen pre-treatment device that executes the pre-treatment required for the analysis with a transport device.

On the other hand, with the advancement of medical care, the importance of specimen analysis is increasing. Further, in order to improve an analysis processing capacity of the specimen analysis system, high-speed transport, simultaneous mass transport, and transport in a plurality of directions of specimens are required.

As a background art in this technical field, there is disclosed in JP-A-2017-77971 (PTL 1). PTL 1 describes a laboratory sample delivery system including several container carriers each of which includes at least one magnetically active device, preferably at least one permanent magnet, and is adapted to transport a sample container, a transport plane adapted to transport the container carriers, and several electromagnetic actuators statically disposed below the transport plane and adapted to move the container carriers on the transport plane by applying a magnetic force to the container carriers (see Summary).

CITATION LIST

Patent Literature

PTL 1: JP-A-2017-77971

SUMMARY OF INVENTION

Technical Problem

PTL 1 describes a laboratory sample delivery system (specimen analysis system) including a container carrier, a transport plane, and a magnetic actuator.

However, PTL 1 does not describe a problem that when the container carrier is moved on the transport plane, pulsation is generated in a thrust for moving the container carrier (hereinafter referred to as an "object to be transported").

Accordingly, the present invention provides a transport device that reduces the pulsation of the thrust that moves the object to be transported, reduces the vibration of the object to be transported during transport, and realizes stable transport, and a specimen analysis system including the transport device.

Solution to Problem

In order to solve the problems described above, the transport device of the present invention includes a first electromagnet unit including a first tooth made of a magnetic body, a first core connected to the first tooth and made of a magnetic body, and a first winding formed around the first core, a second electromagnet unit including a second tooth installed adjacent to the first electromagnet unit and made of a magnetic body, a second core connected to the second tooth and made of a magnetic body, and a second winding formed around the second core, and a magnetic coupling unit made of a magnetic body between the first tooth of the first electromagnet unit and the second tooth of the second electromagnet unit.

Advantageous Effects of Invention

According to the present invention, it is possible to provide a transport device that reduces the pulsation of the thrust that moves an object to be transported, reduces the vibration of the object to be transported during transport, and realizes stable transport, and a specimen analysis system including the transport device.

The problems, configurations and effects other than those described above will be clarified by the description of the following examples.

BRIEF DESCRIPTION OF DRAWINGS

FIG. 1 is a perspective view schematically showing a schematic configuration of a transport device 1 described in Example 1.

FIG. 2 is a sectional view schematically showing a schematic configuration of the transport device 1 described in Example 1.

FIG. 3 is an explanatory diagram showing a thrust and a detent between an electromagnet unit A and an electromagnet unit B.

FIG. 4 is an explanatory diagram showing a change in thrust characteristics when a magnetic coupling unit 23 is installed between a tooth 20A and a tooth 20B.

FIG. 5 is a perspective view schematically showing a configuration of a transport device 1 described in Example 2.

FIG. 6 is a sectional view schematically showing the configuration of the transport device 1 described in Example 2.

FIG. 7 is an exploded perspective view schematically showing the transport device 1 described in Example 2.

FIG. 8 is a sectional view schematically showing a configuration of a transport device 1 described in Example 3.

FIG. 9 is a sectional view schematically showing a configuration of a transport device 1 described in Example 4.

FIG. 10A is a perspective view schematically showing a configuration of a transport device 1 described in Example 5.

FIG. 10B is a top view schematically showing the configuration of the transport device 1 described in Example 5.

FIG. 12 is a top view schematically showing a configuration of a transport device 1 described in Example 8.

FIG. 13 is a top view schematically showing a configuration of a transport device 1 described in Example 9.

FIG. 14 is a top view schematically showing a configuration of a transport device 1 described in Example 10.

FIG. 15 is a top view schematically showing a configuration of a transport device 1 described in Example 11.

FIG. 16A is a perspective view schematically showing a configuration of a transport device 1 described in Example 12.

FIG. 16B is a top view schematically showing the configuration of the transport device 1 described in Example 12.

FIG. 17 is

FIG. 18 is a block diagram schematically showing a schematic configuration of a specimen analysis system including the transport device 1 described in Example 1.

DESCRIPTION OF EMBODIMENTS

Figure 11A:
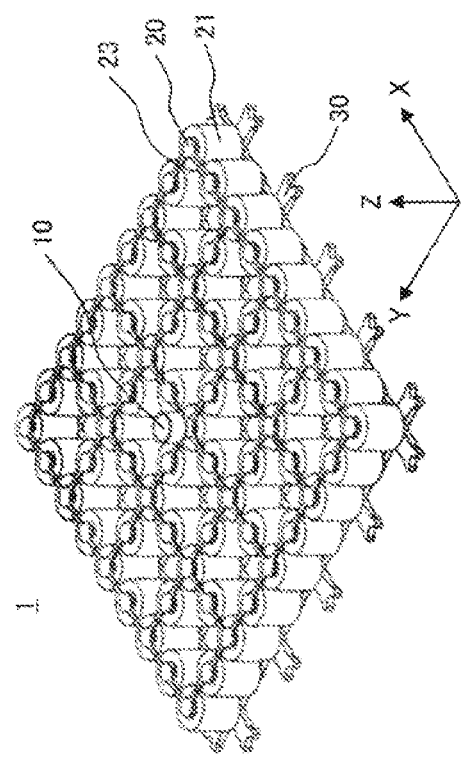
FIGS. 11A to 11C are explanatory diagrams schematically showing a configuration of a transport device 1 described in Example 6.

Hereinafter, examples of the present invention will be described with reference to the drawings. In addition, substantially the same or similar configurations are designated by the same reference numerals, and if the descriptions are duplicated, the description thereof may be omitted.

Example 1

First, a schematic configuration of a transport device 1 described in Example 1 will be schematically described.

FIG. 1 is a perspective view schematically showing a schematic configuration of the transport device 1 described in Example 1.

FIG. 2 is a sectional (XZ cross section) view schematically showing a schematic configuration of the transport device 1 described in Example 1.

The transport device 1 is a device for moving an object to be transported (not shown for convenience of description) including a permanent magnet 10 on a transport plane (not shown for convenience of description), and is a device for generating thrust for moving the object to be transported. A sample container into which a specimen is injected is installed on the object to be transported.

The transport device 1 includes a plurality of electromagnet units. The electromagnet units are installed (fixed) in a line on an electromagnet fixing base 30 made of a magnetic body.

A first electromagnet unit (electromagnet unit A) includes a first tooth (tooth 20A) made of a magnetic body, a first core (core 22A) connected to the tooth 20A and made of a magnetic body (ferromagnetic body), a first winding (winding 21A) formed around (outer circumference side) the core 22A, and a first joint unit (joint unit 24A) that is connected to the core 22A, is made of a magnetic body, and is joined to the electromagnet fixing base 30.

The tooth 20A is connected to an upper part of the core 22A, and the joint unit 24A is connected to a lower part of the core 22A. That is, the lower part (including joint unit 24A) of the core 22A is connected to the electromagnet fixing base 30.

A second electromagnet unit (electromagnet unit B) installed adjacent to the electromagnet unit A includes a second tooth (tooth 20B) made of a magnetic body, a second core (core 22B) connected to the tooth 20B and made of a magnetic body (ferromagnetic body), a second winding (winding 21B) formed around (outer circumference side) the core 22B, and a second joint unit (joint unit 24B) that is connected to the core 22B, is made of a magnetic body, and is joined to the electromagnet fixing base 30.

The tooth 20B is connected to an upper part of the core 22B, and the joint unit 24B is connected to a lower part of the core 22B. That is, the lower part (including the joint unit 24B) of the core 22B is connected to the electromagnet fixing base 30.

Here, "adjacent" may mean, for example, adjacent to each other in a traveling direction of the object to be transported including the permanent magnet 10.

The core 22 and the tooth 20 may be formed integrally or separately, but it is preferable that the core 22 and the tooth 20 are formed separately. Further, it is preferable that the core 22 and the joint unit 24 are formed integrally. It is preferable that the joint unit 24 is installed on the electromagnet fixing base 30 by screw fixing (cutting and screwing in) or press fitting. Further, the electromagnet fixing base 30, the joint unit 24, and the core 22 may be formed integrally. Further, a method of installing the joint unit 24 on the electromagnet fixing base 30 is not limited to screw fixing or press-fitting, and may be another installation method.

Further, the winding 21 may be wound directly around the core 22, or the winding 21 may be wound around a bobbin or the like, and the bobbin or the like around which the winding 21 is wound may be inserted into the core 22.

Further, a diameter (cross section area of tooth 20: area of XY cross section) of the tooth 20 is preferably larger than the diameter (cross section area of core 22: area of XY cross section) of the core 22. The diameter of the tooth 20 is preferably smaller than an outer diameter of the winding 21 and larger than an inner diameter of the winding 21. Further, the diameter of the core 22 is preferably larger than the diameter of the joint unit 24.

In the electromagnet unit, a magnetic force is generated by making a current flow through the winding 21 and exciting the electromagnet unit. Then, when the object to be transported (hereafter, abbreviated as permanent magnet 10) including the permanent magnet 10 is moved from an electromagnet unit A (position 0 (p.u.)) to an electromagnet unit B (position 20 (p.u.)) (in the X direction), the electromagnet unit B is excited to generate a thrust from the electromagnet unit A to the electromagnet unit B. With this configuration, the permanent magnet 10 moves from the electromagnet unit A to the electromagnet unit B.

That is, in order to move the permanent magnet 10 in the X direction, a current is made to flow through the winding 21B to generate the thrust in the X direction. By making the current to flow through the winding 21B, the permanent magnet 10 is attracted to the tooth 20B and moves to the position 20 (p.u.).

On the contrary, when the permanent magnet 20 is moved from the position 20 (p.u.) to the position 0 (p.u.) (in the -X direction), by making a current to flow through the winding 21A, the thrust is generated in the -X direction and the permanent magnet 10 is attracted to the tooth 20A and moves to the position 0 (p.u.).

That is, the permanent magnet 10 can be moved according to a transport path by sequentially exciting the electromagnet units positioned in the transport path according to the transport path of the permanent magnet 10.

Further, the transport device 1 includes a magnetic coupling unit 23 made of a magnetic body between the tooth 20A and the tooth 20B.

As described above, the electromagnet unit A and the electromagnet unit B are magnetically connected by the magnetic coupling unit 23 at the upper part (+Z direction)

and magnetically connected by the electromagnet fixing base 30 at the lower part (−Z direction).

A transport plane made of a non-magnetic body is installed between the permanent magnet 10 and the tooth 20 facing the permanent magnet 10. That is, the transport plane is installed above the electromagnet unit, and the permanent magnet 10 moves on the transport plane. Then, by installing a plurality of electromagnet units in a line on the electromagnet fixing base 30, the permanent magnet 10 can be moved in a wide range in the X direction and/or the Y direction.

In Example 1, a permanent magnet such as a rare earth magnet or a ferrite magnet is used as the permanent magnet 10. However, the present invention is not limited to the permanent magnet, and a soft magnetic body may be used, or a combination of the permanent magnet and the soft magnetic body may be used.

Next, the thrust and the detent between the electromagnet unit A and the electromagnet unit B will be described.

FIG. 3 is an explanatory diagram showing the thrust and the detent between the electromagnet unit A and the electromagnet unit B.

FIG. 3 shows a relationship between thrust characteristics in the X direction (current exists) generated when a current is flown through the winding 21B so as to generate the thrust in the X direction and thrust characteristics in the X direction (current not exist) generated even when no current is flown through the winding 21B, when the magnetic coupling unit 23 is not installed. The thrust characteristic in the X direction, which is generated even when no current is flown through the winding 21B, is hereinafter referred to as "detent".

As shown in FIG. 3, between the position (position 0 (p.u.)) where the permanent magnet 10 and the tooth 20A face each other and the position where the permanent magnet 10 and the tooth 20B face each other (position 20 (p.u.)), and between the position where the permanent magnet 10 and the tooth 20A do not face each other and the position where the permanent magnet 10 and the tooth 20B do not face each other, pulsation is generated in the thrust and the detent by the attractive force generated between the permanent magnet 10 and the tooth 20A and the attractive force generated between the permanent magnet 10 and the tooth 20B.

That is, permeance of a magnetic circuit of the electromagnet unit changes depending on the position of the permanent magnet 10, and pulsation is generated in the thrust.

When a soft magnetic body is used for the permanent magnet 10, pulsation is not generated in the detent. However, when a current is flown through the winding 21B, the permeance of the magnetic circuit of the electromagnet unit changes depending on a position of the soft magnetic body, and the pulsation is generated in the thrust.

When the permanent magnet 10 is moved, that is, when the specimen is transported, the specimen may be transported in an open state. In this case, if the pulsation is generated in the thrust, there is a possibility of scattering of the specimen. Therefore, the transport device 1 needs to reduce the pulsation of the thrust as much as possible.

Therefore, in order to reduce the pulsation of the thrust, the magnetic coupling unit 23 is installed between the tooth 20A and the tooth 20B. The tooth 20A and the tooth 20B and the magnetic coupling unit 23 are magnetically connected to each other. In Example 1, the tooth 20A and the tooth 20B and the magnetic coupling unit 23 are formed separately in structure. The tooth 20A and the tooth 20B and the magnetic coupling unit 23 may be formed integrally.

The electromagnet unit A and the electromagnet unit B are magnetically connected to each other by the magnetic coupling unit 23 at the upper part (a side facing the permanent magnet 10) and magnetically connected to each other by the electromagnet fixing base 30 at the lower part (a side opposite to the side facing the permanent magnet 10).

Next, a change in thrust characteristics when the magnetic coupling unit 23 is installed between the tooth 20A and the tooth 20B will be described.

FIG. 4 is an explanatory diagram showing a change in thrust characteristics when the magnetic coupling unit 23 is installed between the tooth 20A and the tooth 20B.

In FIG. 4, (1) the case where the magnetic coupling unit 23 does not exist is an experimental result when the tooth 20 with a diameter (8 mm: smaller than the inner diameter of winding 21) is used and the magnetic coupling unit 23 is not installed between the tooth 20A and the tooth 20B (comparative example), (2) the case (A) where the magnetic coupling unit 23 exists is an experimental result when the tooth 20 with the diameter (8 mm: smaller than the inner diameter of winding 21) is used and the magnetic coupling unit 23 with a thickness of 1.0 mm (dimension in the Z direction) and a width of 1.0 mm (dimension in the Y direction) is installed between the tooth 20A and the tooth 20B, (3) the case (B) where the magnetic coupling unit 23 exists is an experimental result when the tooth 20 with a diameter (14 mm: larger than the inner diameter of winding 21 (see FIG. 2)) is used and the magnetic coupling unit 23 with a thickness of 0.5 mm (dimension in the Z direction) and a width of 1.0 mm (dimension in the Y direction) is installed between the tooth 20A and the tooth 20B, and (4) the case (C) where the magnetic coupling unit 23 exists is an experimental result when the tooth 20 with a diameter (14 mm: larger than the inner diameter of winding 21 (see FIG. 2)) is used and the magnetic coupling unit 23 with a thickness of 1.0 mm (dimension in the Z direction) and a width of 1.0 mm (dimension in the Y direction) is installed between the tooth 20A and the tooth 20B.

As shown in FIG. 4, when the permanent magnet 1 is moved, in (2), although the thrust is reduced as compared with that of the comparative example, the change in the permeance of the magnetic circuit of the electromagnet unit is small, and the pulsation of the thrust can be reduced.

Furthermore, in (3), the thrust is maintained almost the same as in the comparative example, the change in the permeance of the magnetic circuit of the electromagnet unit is small, and the pulsation of the thrust can be reduced.

Furthermore, in (4), although the thrust is slightly reduced as compared with the comparative example, the change in the permeance of the magnetic circuit of the electromagnet unit is small, and the pulsation of the thrust can be greatly reduced.

It can be seen that when a cross section area of the magnetic coupling unit 23 (area of YZ cross section) becomes large (comparison between (3) and (4)), the magnetic flux acting on the permanent magnet 10 decreases and the thrust decreases. Therefore, the cross section area of the magnetic coupling unit 23 is preferably 0.5 mm$^2$ or more and 1.0 mm$^2$ or less. With this configuration, the pulsation of the thrust can be reduced without significantly lowering the thrust.

When the thickness of the tooth 20 and the thickness of the magnetic coupling unit 23 are the same, the width of the magnetic coupling unit 23 is preferably ⅒ to ⅕ of the diameter of the tooth 20. With this configuration, the pulsation of the thrust can be reduced while suppressing the lowering of the thrust.

Further, by increasing the diameter of the tooth 20, the lowering of the thrust can be suppressed. Then, by installing the magnetic coupling unit 23 on the upper part (the side facing the permanent magnet 10) of the electromagnet unit, the diameter of the tooth 20 can be increased. With this configuration, the thrust can be increased and the pulsation of the thrust can be reduced.

Furthermore, by connecting the electromagnet fixing base 30 to the lower part (the side opposite to the side facing the permanent magnet 10) of the electromagnet unit, a magnetic circuit (closed magnetic path) of the tooth 20A, the magnetic coupling unit 23, the tooth 20B, the core 22B, the joint unit 24B, the electromagnet fixing base 30, the joint unit 24A, the core 22A, and the tooth 20A can be configured together with the magnetic coupling unit 23.

As described above, according to Example 1, when the permanent magnet 10 is moved, the pulsation of the thrust can be reduced (makes the change in thrust at each position small), and an occurrence of scattering of the specimen and the like can be reduced. Accordingly, the permanent magnet 10 can be stably moved with a large thrust in the direction in which the permanent magnet 10 is desired to be moved.

Further, according to Example 1, it is not necessary to increase the cross section area (area of XY cross section) of the core 22 in order to increase the thrust, and the space for the winding 21 is not reduced. Accordingly, the workability of installing the winding 21 does not deteriorate when the winding 21 is wound around the core 22 or when a bobbin or the like around which the winding 21 is wound is inserted into the core 22.

The transport device described in Example 1 includes the electromagnet unit A (first electromagnet unit) including the tooth 20A (first tooth) made of a magnetic body, the core 22A (first core) connected to the tooth 20A and made of a magnetic body, and the winding 21A (first winding) formed around the core 22A, the electromagnet unit B (second electromagnet unit) installed adjacent to the electromagnet unit A and including the tooth 20B (second tooth) made of a magnetic body, the core 22B (second core) connected to the tooth 20B and made of a magnetic body, and the winding 21B (second winding) formed around the core 22B, and the magnetic coupling unit 23 made of a magnetic body between the tooth 20A of the electromagnet unit A and the tooth 20B of the electromagnet unit B.

As described above, in the transport device 1 described in Example 1, the electromagnet fixing base 30 of which bottom part has a grid shape is installed, and the first electromagnet unit (including the core 22, winding 21, and tooth 20 integrally formed with the joint unit 24) and the second electromagnet unit (including the core 22, winding 21, and tooth 20 integrally formed with the joint unit 24) are installed on the electromagnet fixing base 30.

Then, the magnetic coupling unit 23 is installed between the tooth 20 of the first electromagnet unit and the tooth 20 of the second electromagnet unit, and the transport plane is installed above a member forming the tooth 20 and the magnetic coupling unit 23. The permanent magnet 10 moves on a transport plane 50.

With this configuration, according to Example 1, the pulsation of the thrust for moving the permanent magnet 10 can be reduced, the vibration of the permanent magnet 10 during the movement of the permanent magnet 10 can be reduced, and stable movement can be realized.

Next, a schematic configuration of the specimen analysis system including the transport device 1 described in Example 1 will be schematically described.

FIG. 18 is a block diagram schematically showing a schematic configuration of the specimen analysis system including the transport device 1 described in Example 1.

A specimen analysis system 100 includes a specimen pre-treatment device 200 that performs the pre-treatment required for analysis, a specimen analysis device 300 that performs a plurality of analyses, and the transport device 1 installed between the specimen pre-treatment device 200 and the specimen analysis device 300.

With this configuration, when the specimen is transported from the specimen pre-treatment device 200 to the specimen analysis device 300, especially when the permanent magnet 10 is moved in the transport device 1, the pulsation of the thrust can be reduced.

Example 2

Next, the configuration of the transport device 1 described in Example 2 will be schematically described.

FIG. 5 is a perspective view schematically showing a configuration of the transport device 1 described in Example 2.

In the transport device 1 described in Example 2, 25 electromagnet units of 5 rows (X direction)×5 rows (Y direction) are installed in a line. That is, the permanent magnet 10 can move within a range of 5 teeth in the X direction and 5 teeth in the Y direction. The principle of a moving operation of the permanent magnet 10 and a basic configuration of the transport device 1 are the same as those in Example 1.

Further, the transport device 1 includes a magnetic coupling unit 23A between the tooth 20A having a circular shape and the tooth 20B having a circular shape in the X direction, and includes a magnetic coupling unit 23B between the tooth 20B having a circular shape and a tooth 20C having a circular shape in the Y direction. The transport device 1 moves the permanent magnet 10 in either direction in the X direction or the Y direction.

That is, in the transport device 1, a plurality of electromagnet units are installed in a line, and the transport device 1 includes the magnetic coupling unit 23A installed between the teeth 20 adjacent in the X direction and the magnetic coupling unit 23B installed between the teeth 20 adjacent in the Y direction.

The 25 electromagnet units are installed in a line on the electromagnet fixing base 30 formed in a grid pattern at the lower parts of the respective electromagnet units.

By installing the magnetic coupling unit 23A and the magnetic coupling unit 23B in this way, the pulsation of the thrust can be reduced regardless of whether the permanent magnet 10 is moved in the X direction or the Y direction. Furthermore, since the respective teeth are connected to each other by the magnetic coupling unit 23 in the X direction and the Y direction, the rigidity of the magnetic circuit of the electromagnet unit is improved, and the pulsation of the thrust can be reduced in the X direction and the Y direction. Further, vibration, noise, or the like of the permanent magnet 10 caused by pulsation generated by the change of the current flowing through the winding 21 can be reduced.

FIG. 6 is a sectional (XZ cross section) view schematically showing the configuration of the transport device 1 described in Example 2. FIG. 6 shows a cross section (XZ cross section) of the magnetic circuit cut out along a dotted line E shown in FIG. 5.

In Example 2, the magnetic coupling unit 23A installed between the tooth 20A and the tooth 20B is integrally formed with the tooth 20A and the tooth 20B, and the magnetic coupling unit 23B installed between the tooth 20B and the tooth 20C is integrally formed with the tooth 20B and the tooth 20C. As described above, in Example 2, the tooth 20 and the magnetic coupling unit 23 are formed integrally.

Further, in Example 2, the core 22 and the tooth 20 are formed separately, and the core 22 and the joint unit 24 are formed integrally. Then, the joint unit 24 is installed on the electromagnet fixing base 30 by press fitting.

By forming the core 22 and the tooth 20 separately in this way, the winding 21 can be easily assembled.

Next, the transport device 1 described in Example 2 will be schematically disassembled and described.

FIG. 7 is an exploded perspective view schematically showing the transport device 1 described in Example 2.

The transport device 1 is manufactured by the following manufacturing process.

(1) The electromagnet fixing base 30 formed in a grid pattern is installed.

(2) The joint unit 24 and the core 22 formed integrally are installed in a pin holder shape (aligned upright in a line) on the electromagnet fixing base 30. In Example 2, the joint unit 24 is installed on the electromagnet fixing base 30 by press fitting.

(3) The winding 21 is installed on the core 22 installed in the pin holder shape. In Example 2, the winding 21 is wound around a bobbin or the like, and the bobbin or the like around which the winding 21 is wound is inserted into the core 22.

(4) The tooth 20 and the magnetic coupling unit 23 formed integrally are installed on the core 22, in which the winding 21 is installed, so as to cover the core 22.

For example, when the tooth 20 and the core 22 are formed integrally, the tooth 20 and the core 22 have a T-shape in an XZ cross section. When the winding 21 is installed on the core 22 having a T-shape, the workability of installing the winding 21 may deteriorate.

Therefore, the core 22 and the tooth 20 are formed separately, and the tooth 20 and the magnetic coupling unit 23 formed integrally are installed so as to cover the core 22. With this configuration, the workability of installing the winding 21 does not deteriorate.

With this configuration, the transport device 1 can be manufactured by a series of manufacturing processes in which the joint unit 24 and the core 22 formed integrally are installed on the electromagnet fixing base 30, the winding 21 is installed on the core 22, and the teeth 20 and the magnetic coupling unit 23 formed integrally are installed on the core 22.

Further, by forming the core 22 and the tooth 20 separately, the diameter of the tooth 20 can be easily made larger than the diameter of the core 22. That is, the thrust can be increased by making the diameter of the tooth 20 larger than the diameter of the core 22.

As described above, according to Example 2, the pulsation of the thrust is reduced by installing the magnetic coupling unit 23. Then, by forming the core 22 and the tooth 20 separately, the diameter of the tooth 20 can be made larger than the diameter of the core 22 to increase the thrust, and the lowering of the thrust due to the installation of the magnetic coupling unit 23 can be suppressed. Further, the workability of installing the winding 21 is not deteriorated. Furthermore, by forming the tooth 20 and the magnetic coupling unit 23 integrally, the rigidity of a member forming the tooth 20 and the magnetic coupling unit 23 can be improved.

Further, by forming the core 22 and the tooth 20 separately, for example, if the manufacturing accuracy of the tooth 20 and the magnetic coupling unit 23, which have a large influence on the thrust characteristics, can be ensured, even if there are some variations in a processing accuracy and an assembly accuracy of the core 22 and the electromagnet fixing base 30, the influence on the thrust characteristics can be reduced.

Further, by forming the core 22 and the tooth 20 separately, for example, if a positional accuracy between the tooth 20 and the magnetic coupling unit 23 can be ensured, the processing accuracy and the assembly accuracy of the core 22 and the electromagnet fixing base 30, which have little influence on the thrust characteristics, can be relaxed.

Example 3

Next, the configuration of the transport device 1 described in Example 3 will be schematically described.

FIG. 8 is a sectional (XZ cross section) view schematically showing a configuration of the transport device 1 described in Example 3. The principle of the moving operation of the permanent magnet 10 and the basic configuration of the transport device 1 are the same as those in Example 1.

In the transport device 1 described in Example 3, the core 22 and the tooth 20 are formed separately, and the core 22 and the joint unit 24 are formed integrally. Then, the joint unit 24 is installed on the electromagnet fixing base 30 by press fitting. Then, the winding 21 is inserted into the core 22.

The tooth 20A is installed on the upper part of the core 22A, the tooth 20B is installed on the upper part of the core 22B, and the magnetic coupling unit 23 is installed between the tooth 20A and the tooth 20B. In Example 3, the tooth 20A, the tooth 20B, and the magnetic coupling unit 23 are formed separately. However, the tooth 20A, the tooth 20B, and the magnetic coupling unit 23 may be formed integrally. Further, it is preferable that the tooth 20A, the tooth 20B, and the magnetic coupling unit 23 have the same thickness.

Then, in Example 3, the tooth 20A, the tooth 20B, and the magnetic coupling unit 23 are embedded in the transport plane 50 on which the permanent magnet 10 moves. The transport plane 50 is formed of a non-magnetic body (for example, resin or the like).

For example, when the tooth 20A, the tooth 20B, and the magnetic coupling unit 23 are individually manufactured and the transport plane 50 is formed by injection molding or the like, the tooth 20A, the tooth 20B, and the magnetic coupling unit 23 are embedded and formed in the transport plane 50.

With this configuration, in Example 3, the thrust characteristics can be easily changed by changing the transport plane 50 in which the tooth 20A, the tooth 20B, and the magnetic coupling unit 23 are embedded.

Example 4

Next, the configuration of the transport device 1 described in Example 4 will be schematically described.

FIG. 9 is a sectional (XZ cross section) view schematically showing a configuration of the transport device 1 described in Example 4. The principle of the moving operation of the permanent magnet 10 and the basic configuration of the transport device 1 are the same as those in Example 1.

In the transport device 1 described in Example 4, the core 22 and the tooth 20 are formed separately, and the core 22 and the joint unit 24 are formed integrally. Then, the joint unit 24 is installed on the electromagnet fixing base 30 by press fitting. Then, the winding 21 is inserted into the core 22.

The tooth 20A is installed on the upper part of the core 22A, the tooth 20B is installed on the upper part of the core 22B, and the magnetic coupling unit 23 is installed between the tooth 20A and the tooth 20B. In Example 4, the tooth 20A, the tooth 20B, and the magnetic coupling unit 23 are formed integrally. However, the tooth 20A, the tooth 20B, and the magnetic coupling unit 23 may be formed separately. Further, it is preferable that the tooth 20A, the tooth 20B, and the magnetic coupling unit 23 have the same thickness.

Then, in Example 4, the tooth 20A, the tooth 20B, and the magnetic coupling unit 23 are installed between the transport plane 50 on which the permanent magnet 10 moves and the core 22A and the core 22B. That is, the transport plane 50 is installed above the tooth 20A, the tooth 20B, and the magnetic coupling unit 23. The transport plane 50 is formed of a non-magnetic body (for example, resin or the like).

In particular, in Example 4, the tooth 20A, the tooth 20B, and the magnetic coupling unit 23 are formed integrally in a plate shape.

With this configuration, the tooth 20A, the tooth 20B, and the magnetic coupling unit 23 can be easily formed by pressing or the like. Further, the rigidity of the plate-shaped member forming the tooth 20A, the tooth 20B, and the magnetic coupling unit 23 can be improved, the deformation of the member during work is prevented, and the handling of the member is facilitated.

Further, the plate-shaped member forming the tooth 20A, the tooth 20B, and the magnetic coupling unit 23 is made of, for example, an electromagnetic steel plate, and a plurality of sheets of the plates can be stacked in the Z direction to obtain the required thrust characteristics. Further, the thrust characteristics can be changed by changing the number of sheets to be stacked in the Z direction.

Further, according to Example 4, even when the transport plane 50 is worn, the transport plane 50 can be easily replaced.

Example 5

Next, the configuration of the transport device 1 described in Example 5 will be schematically described.

FIG. 10A is a perspective view schematically showing a configuration of the transport device 1 described in Example 5.

FIG. 10B is a top view schematically showing the configuration of the transport device 1 described in Example 5.

The transport device 1 described in Example 5 is different from the transport device 1 described in Example 2 in that there are a plurality of types (two types in Example 5) of diameters of the tooth 20 installed on the upper part of the core 22 and there are a plurality of types (two types in Example 5) of widths of the magnetic coupling unit 23 installed between the tooth 20 and the tooth 20.

The dotted line A, the dotted line B, the dotted line C, the dotted line D, and the dotted line E shown in FIG. 10A are transport paths (transport lines) on which the permanent magnet 10 moves.

The diameter of a tooth 20E installed on the transport path A and the transport path B is larger than the diameter of a tooth 20F installed on the transport path C, the transport path D, and the transport path E.

Further, the width of a magnetic coupling unit 23E installed on the transport path A and the transport path B is narrower than the width of a magnetic coupling unit 23F installed on the transport path C, the transport path D, and the transport path E.

In this way, in one transport device 1, the diameter of the tooth 20 and the width of the magnetic coupling unit 23 are changed according to the characteristics of the transport path.

The thrust characteristics of the transport device 1 vary depending on the diameter (shape) of the tooth 20 and the width (shape) of the magnetic coupling unit 23. That is, even if the winding 21, core 22, joint unit 24, and electromagnet fixing base 30 are the same, by changing the diameter of the tooth 20 and the width of the magnetic coupling unit 23, the effect of reducing the pulsation of the thrust and the effect of suppressing the lowering of the thrust (promoting effect of thrust) can be changed. Further, the degree of freedom in designing the winding 21, the core 22, the joint unit 24, and the electromagnet fixing base 30 is also increased.

For example, a transport path having a large effect of reducing the pulsation of the thrust and a transport path having a small effect of reducing the pulsation of the thrust can be installed, and a transport path having a large effect of promoting the thrust and a transport path having a small effect of promoting the thrust can be installed.

In Example 5, the transport paths (characteristics of transport path (a)) having a large effect of reducing the pulsation of the thrust and having a small effect of promoting the thrust are the transport path C, the transport path D, and the transport path E, and the transport paths (characteristics of transport path (b)) having a small effect of reducing the pulsation of the thrust and having a large effect of promoting the thrust are the transport path A and the transport path B.

That is, in the transport device 1, a plurality of electromagnet units are installed in a line and a plurality of transport paths are installed, and the shape of the tooth 20 and/or the shape of the magnetic coupling unit 23 can be changed according to the characteristics of the transport path.

As described above, according to Example 5, the transport device 1 having transport paths having different characteristics of the transport path can be provided in one transport device 1. For example, in the transport path having the characteristic (a) of the transport path, the specimen is transported at a low speed in an open state, and in the transport path having characteristic (b) of the transport path, the specimen is transported at high speed in a closed state.

Example 6

Next, the configuration of the transport device 1 described in Example 6 will be schematically described.

FIG. 11 is an explanatory diagram schematically showing a configuration of the transport device 1 described in Example 6.

Figure 11B:
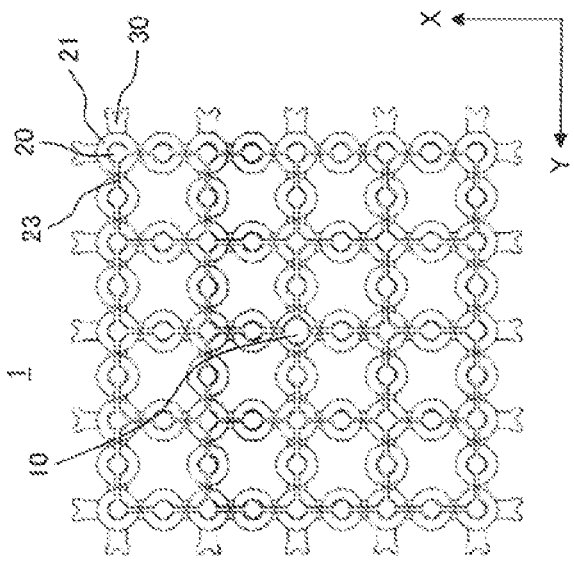
Figure 11C:
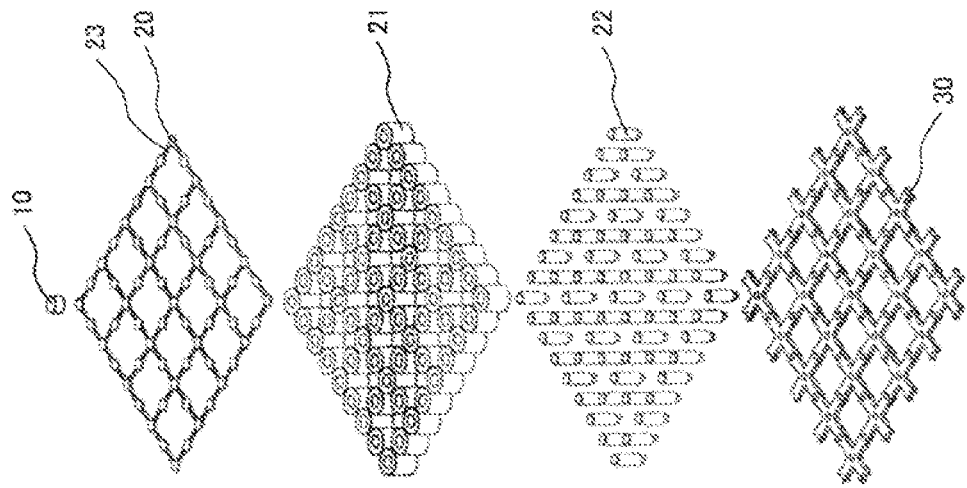

FIG. 11(a) is a perspective view schematically showing the configuration of the transport device 1 described in Example 6, FIG. 11(b) is a top view schematically showing the configuration of the transport device 1 described in Example 6, and FIG. 11(c) is an exploded perspective view schematically showing the transport device 1 described in Example 6.

The transport device 1 described in Example 4 is different from the transport device 1 described in Example 2 in the following points.

(1) The diameter of the tooth 20 and the diameter of the core 22 are the same.

(2) The transport path is provided with nine electromagnet units in the X direction and Y direction, and five electromagnet units are provided in the X direction and the Y direction between the transport path and the transport path.

(3) The electromagnet units installed between the transport path and the transport path are alternately installed.

According to (1), the state of the winding 21 can be easily surveyed from above. That is, when a defect such as an insulation failure occurs in the winding 21, the defect can be visually confirmed, and the winding 21 in which the defect has occurred can be easily determined.

Since the tooth 20 and the magnetic coupling unit 23 are formed integrally, the tooth 20 and the magnetic coupling unit 23 can be easily removed, and the winding 21 in which a defect has occurred can be easily replaced.

According to (2) and (3), for example, when there are two permanent magnets 10 that move in adjacent transport paths at the same time, each permanent magnet 10 can be moved so as not to interfere with each other between the two permanent magnets 10. This is particularly effective when one transport device 1 has transport paths having different characteristics of the transport path.

Figure 17A:
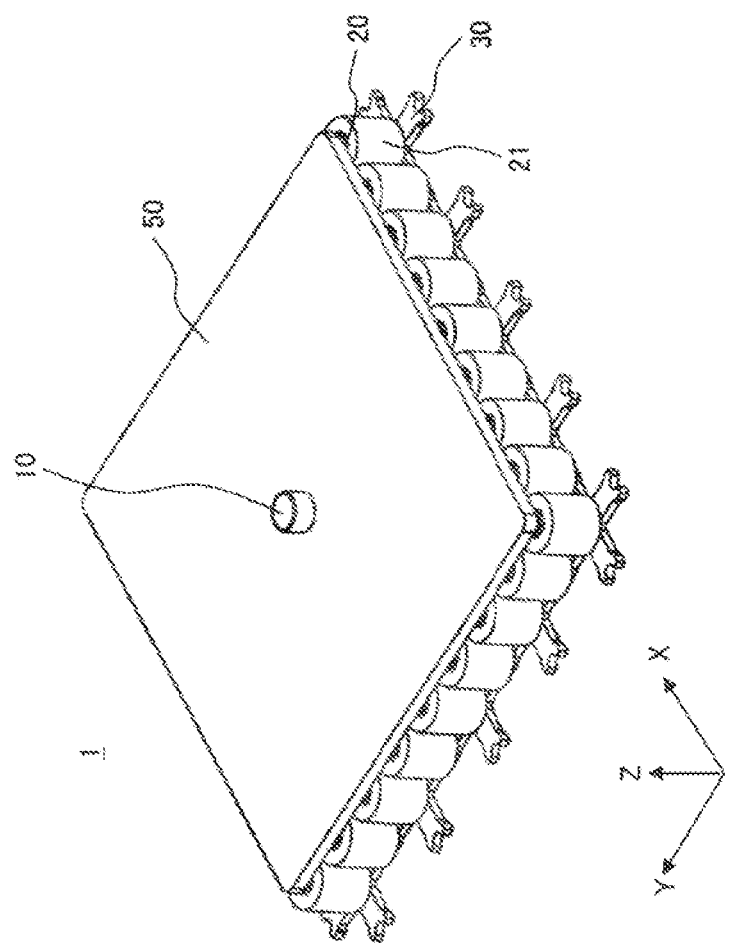
FIGS. 17A and 17B are explanatory diagrams schematically showing a configuration of the transport device 1 described in Example 6, in which a transport plane 50 is added.
Figure 17B:
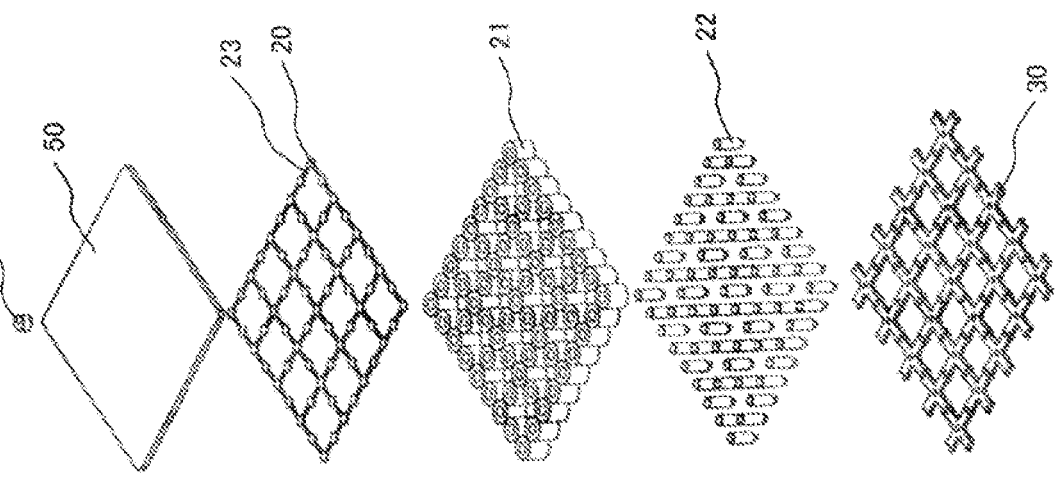

FIG. 17 is an explanatory diagram schematically showing a configuration of the transport device 1 described in Example 6, in which the transport plane 50 is added.

FIG. 17(*a*) is a perspective view schematically showing a configuration with the transport plane 50 of the transport device 1 described in Example 6 added, and FIG. 17(*b*) is an exploded perspective view schematically showing the transport device 1 described in Example 6.

As shown in FIG. 17, the transport plane 50 is installed above the member forming the tooth 20 and the magnetic coupling unit 23. Then, the permanent magnet 10 moves on the transport plane 50.

Example 7

The transport device 1 described in Example 7 is different from the transport device 1 described in Example 6 in that the diameter of the tooth 20 is larger than the diameter of the core 22.

The transport device 1 described in Example 7, similarly to the transport device 1 described in Example 6, has 5×5 transport paths (5 transport paths in the X direction and 5 transport paths in the Y direction) on which the electromagnet units are installed in a grid pattern.

Further, in the transport device 1 described in Example 7, similar to the transport device 1 described in Example 6, the electromagnet unit installed between the transport path and the transport path also includes the tooth 20, the core 22 connected to the tooth 20, the winding 21 formed around the core 22, and the joint unit 24 connected to the core 22 and joined to the electromagnet fixing base 30.

With this configuration, for example, when there are two permanent magnets 10 that move in adjacent transport paths at the same time, each permanent magnet 10 can be moved so as not to interfere with each other between the two permanent magnets 10. This is particularly effective when one transport device 1 has transport paths having different characteristics of the transport path. Furthermore, the thrust can be increased.

The transport device 1 can move the permanent magnet 10 in the X direction, the Y direction, and the XY direction.

Example 8

Next, the configuration of the transport device 1 described in Example 8 will be schematically described.

FIG. 12 is a top view schematically showing a configuration of the transport device 1 described in Example 8.

The transport device 1 described in Example 8 is different from the transport device 1 described in Example 7 in the shape of the tooth 20 and the shape of the magnetic coupling unit 23.

That is, in Example 7, the tooth 20 has a circular shape and the magnetic coupling unit 23 has a linear shape. In Example 8, the tooth 20 has an approximately circular shape, but the magnetic coupling unit 23 has a curved shape.

By forming the magnetic coupling unit 23 into a curved shape, the change in the permeance of the magnetic circuit of the electromagnet unit when the permanent magnet 10 moves can be made smooth, and the pulsation of the thrust can be reduced. By changing the shape of the magnetic coupling unit 23 in this way, the change in the permeance of the magnetic circuit of the electromagnet unit can be adjusted, and the pulsation of the thrust can be reduced.

In particular, in Example 8, it is preferable that the core 22 and the tooth 20 are formed separately.

Example 9

The configuration of the transport device 1 described in Example 9 will be schematically described.

FIG. 13 is a top view schematically showing a configuration of the transport device 1 described in Example 9.

The transport device 1 described in Example 9 is different from the transport device 1 described in Example 7 in the shape of the tooth 20.

That is, in Example 7, the tooth 20 has a circular shape, but in the Example 9, the tooth 20 has a rectangular shape (square shape in Example 9). Then, the tooth 20 is connected to the magnetic coupling unit 23 at the corner portion of the rectangular shape.

By forming the tooth 20 into a rectangular shape and connecting the tooth 20 to the magnetic coupling unit 23 at the corner of the rectangular shape, when the permanent magnet 10 has a circular shape, the amount of change in a facing surface between the circular permanent magnet 10 and the rectangular tooth 20 can be made constant (smooth). With this configuration, the change in the permeance of the magnetic circuit of the electromagnet unit can be made constant (smooth), and the pulsation of the thrust can be reduced.

In Example 9, the shape of the tooth 20 is formed into a rectangular shape, but the shape is not limited thereto, and a polygonal shape may be used.

Further, in particular, in Example 9, it is preferable that the core 22 and the tooth 20 are formed separately.

Example 10

Next, the configuration of the transport device 1 described in Example 10 will be schematically described.

FIG. 14 is a top view schematically showing a configuration of the transport device 1 described in Example 10.

The transport device 1 described in Example 10 is different from the transport device 1 described in Example 7 in the shape of the tooth 20 and the shape of the magnetic coupling unit 23.

That is, in Example 7, the tooth 20 has a circular shape and the magnetic coupling unit 23 has a linear shape, but in Example 10, the tooth 20 has an approximately rectangular shape (approximately square shape in Example 10) and the magnetic coupling unit 23 has a curved shape. Then, the tooth 20 is connected to the magnetic coupling unit 23 at the side portion of the rectangular shape.

By forming the tooth 20 into a rectangular shape and connecting it to the magnetic coupling unit 23 at the side portion of the rectangular shape, in addition to when the permanent magnet 10 moves in the X direction and when the permanent magnet 10 moves in the Y direction, even when the permanent magnet 10 moves in the XY direction, the pulsation of the thrust can be reduced.

When the permanent magnet 10 moves in the X direction and when the permanent magnet 10 moves in the Y direction, since the magnetic coupling unit 23 is installed between the tooth 20 and the tooth 20, the pulsation of the thrust can be reduced.

On the other hand, when the permanent magnet 10 moves in the XY direction (for example, when the permanent magnet 10 moves from a tooth 20G to a tooth 20H), a moving distance of the permanent magnet 10 is approximately doubled as compared to when the permanent magnet 10 moves in the X direction or the Y direction (for example, when the permanent magnet 10 moves from the tooth 20G to a tooth 20I, or when the permanent magnet 10 moves from the tooth 20I to the tooth 20H). That is, when the permanent magnet 10 moves in the XY direction, the moving distance of the permanent magnet 10 becomes large and a large thrust is required compared to when the permanent magnet 10 moves in the X direction or the Y direction.

Therefore, in Example 10, the tooth 20 are formed into a rectangular shape, and the tooth 20 are installed so that the corner of the rectangular shape is on a diagonal line of the rectangular shape.

Even when the permanent magnet 10 moves in the XY direction by moving on the diagonal line of the rectangular shape, an area where the permanent magnet 10 and the tooth 20 face each other can be increased, and the pulsation of the thrust can be reduced.

In Example 10, the shape of the tooth 20 is formed into a rectangular shape, but the shape is not limited thereto and may be formed into a polygonal shape.

Further, in particular, in Example 10, it is preferable that the core 22 and the tooth 20 are formed separately.

Example 11

Next, the configuration of the transport device 1 described in Example 11 will be schematically described.

FIG. 15 is a top view schematically showing a configuration of the transport device 1 described in Example 11.

The transport device 1 described in Example 11 is different from the transport device 1 described in Example 7 in the shape of the tooth 20.

That is, in Example 7, the shape of the tooth 20 is not changed at an installation position of the electromagnet unit, but in Example 11, the shape of the tooth 20 is changed at the installation position of the electromagnet unit.

In Example 11, the tooth 20 has the following six types of shapes. For example, (1) a shape of tooth 20 connected to the magnetic coupling unit 23 at two points in the X direction and the Y direction, (2) a shape of tooth 20 connected to the magnetic coupling unit 23 at two points in the X direction, (3) a shape of tooth 20 connected to the magnetic coupling unit 23 at two points in the Y direction, (4) a shape of tooth 20 connected to the magnetic coupling unit 23 at two points in the X direction and one point in the Y direction, (5) a shape of tooth 20 connected to the magnetic coupling unit 23 at one point in the X direction and two points in the Y direction, and (6) a shape of tooth 20 connected to the magnetic coupling unit 23 at two points in the X direction and two points in the Y direction.

The (2) and (3) are the positions where the teeth 20 are installed on a straight line, the (4) and (5) are the positions where the teeth 20 are installed in a T shape, and the (6) is the position where the teeth 20 are installed in a cross shape.

In this way, the shape of the tooth 20 can be changed depending on the installation position of the electromagnet unit. With this configuration, the thrust characteristics can be changed depending on the installation position of the electromagnet unit.

Further, in particular, in Example 11, it is preferable that the core 22 and the tooth 20 are formed separately.

Example 12

Next, the configuration of the transport device 1 described in Example 12 will be schematically described.

FIG. 16A is a perspective view schematically showing a configuration of the transport device 1 described in Example 12.

FIG. 16B is a top view schematically showing the configuration of the transport device 1 described in Example 12.

The transport device 1 described in Example 12 is different from the transport device 1 described in Example 7 in the installation position of the magnetic coupling unit 23.

That is, in Example 7, the magnetic coupling unit 23 is installed between the tooth 20 and the tooth 20 in the X direction and the Y direction. In Example 12, the magnetic coupling unit 23 is also installed in the XY direction. As described above, the transport device 1 includes the magnetic coupling unit 23A in the X direction, the magnetic coupling unit 23B in the Y direction, and a magnetic coupling unit 23C in the XY direction.

That is, in the transport device 1, a plurality of electromagnet units are installed in a line, and the transport device 1 includes the magnetic coupling unit 23A installed between the teeth 20 adjacent to each other in the X direction, the magnetic coupling unit 23B installed between the teeth 20 adjacent to each other in the Y direction, and the magnetic coupling unit 23C installed between the teeth 20 adjacent to each other in the XY direction.

By installing the magnetic coupling unit 23C in the XY direction, the pulsation of the thrust when the permanent magnet 10 moves in the XY direction can be reduced.

Furthermore, with this configuration, the rigidity of the member forming the tooth 20 and the magnetic coupling unit 23 can be improved. That is, this is because the tooth 20 and the magnetic coupling unit 23 can be connected in a mesh pattern by the magnetic coupling unit 23A in the X direction, the magnetic coupling unit 23B in the Y direction, and the magnetic coupling unit 23C in the XY direction.

The present invention is not limited to the examples described above, and includes various modifications. For example, the examples described above are specifically described in order to explain the present invention in an easy-to-understand manner, and are not necessarily limited to those having all the described configurations.

A part of the configuration of one example can be replaced with a part of the configuration of another example. The configuration of another example can be added to the configuration of one example. A part of the configuration of each example can be deleted, a part of the other configuration thereof can be added thereto, and can be replaced with a part of the other configuration thereof.

REFERENCE SIGNS LIST

1: transport device
10: permanent magnet
20: tooth
21: winding
22: core
23: magnetic coupling unit
24: joint unit
30: electromagnet fixing base
50: transport plane
100: specimen analysis system
200: specimen pre-treatment device
300: specimen analysis device

The invention claimed is:

1. A transport device comprising:
a first electromagnet unit including a first tooth made of a magnetic body, a first core connected to the first tooth and made of a magnetic body, and a first winding formed around the first core;
a second electromagnet unit including a second tooth installed adjacent to the first electromagnet unit and made of a magnetic body, a second core connected to the second tooth and made of a magnetic body, and a second winding formed around the second core; and
a magnetic coupling unit made of a magnetic body between the first tooth of the first electromagnet unit and the second tooth of the second electromagnet unit.

2. The transport device according to claim 1, wherein the first electromagnet unit and the second electromagnet unit are installed in a line on an electromagnet unit fixing base made of a magnetic body.

3. The transport device according to claim 2, wherein the first tooth is connected to an upper part of the first core, a lower part of the first core is connected to the electromagnet unit fixing base, and the second tooth is connected to an upper part of the second core, and the lower part of the second core is connected to the electromagnet unit fixing base.

4. The transport device according to claim 2, wherein the first electromagnet unit and the second electromagnet unit are magnetically connected at the upper part thereof by the magnetic coupling unit and magnetically connected at the lower part thereof by the electromagnet unit fixing base.

5. The transport device according to claim 1, wherein the first tooth, the second tooth, and the magnetic coupling unit are integrally formed.

6. The transport device according to claim 1, wherein the first core and the first tooth are formed separately, and the second core and the second tooth are formed separately.

7. The transport device according to claim 1, further comprising:
a transport plane on which an object to be transported moves, wherein
the first tooth, the second tooth, and the magnetic coupling unit are embedded in the transport plane.

8. The transport device according to claim 1, further comprising
a transport plane on which an object to be transported moves, wherein
the first tooth, the second tooth, and the magnetic coupling unit are installed between the transport plane and the first and second cores.

9. The transport device according to claim 1, wherein
a plurality of electromagnet units are installed in a line, a plurality of transport paths are installed, and a shape of the tooth and/or a shape of the magnetic coupling unit are changed according to the transport paths.

10. The transport device according to claim 1, wherein
a plurality of electromagnet units are installed in a line, and
a magnetic coupling unit installed between teeth adjacent in the X direction, and a magnetic coupling unit installed between teeth adjacent in the Y direction are provided.

11. The transport device according to claim 10, further comprising:
a magnetic coupling unit installed between teeth adjacent in the XY directions.

12. The transport device according to claim 1, wherein
the diameter of the first tooth is larger than the diameter of the first core, and the diameter of the second tooth is larger than the diameter of the second core.

13. The transport device according to claim 1, wherein
the shape of the first tooth and the shape of the second tooth are circular.

14. The transport device according to claim 1, wherein
the shape of the first tooth and the shape of the second tooth are rectangular.

15. A specimen analysis system comprising the transport device according to claim 1.

* * * * *